June 12, 1934.  J. GUTMANN, JR  1,962,736
JACKING APPARATUS FOR MOTOR VEHICLES
Filed May 31, 1930  2 Sheets-Sheet 1
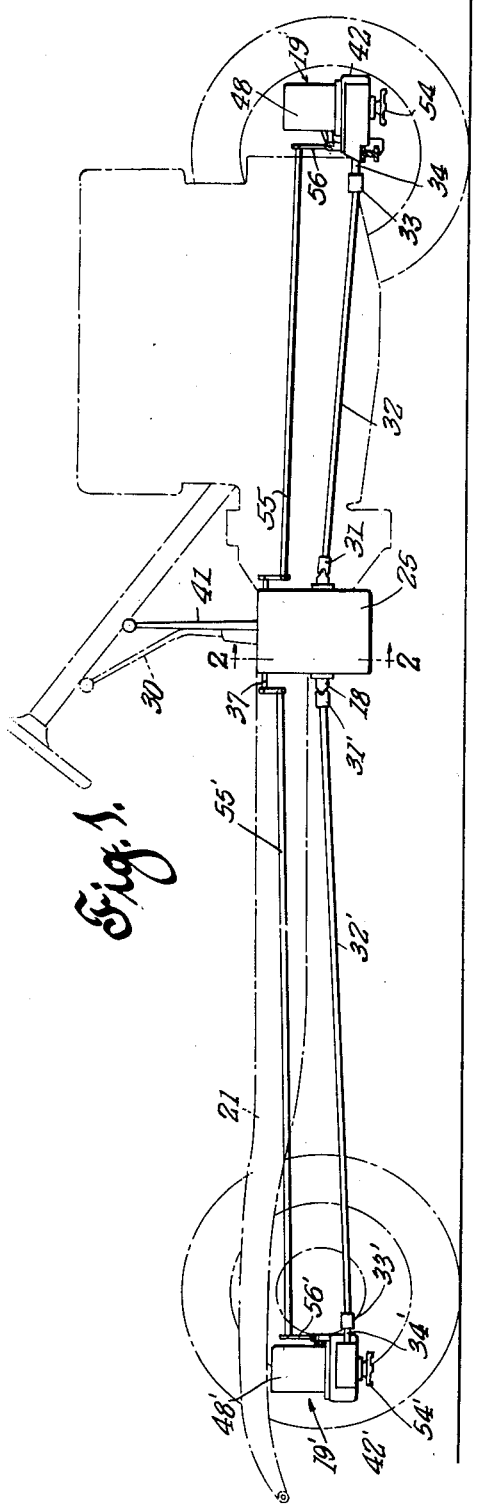
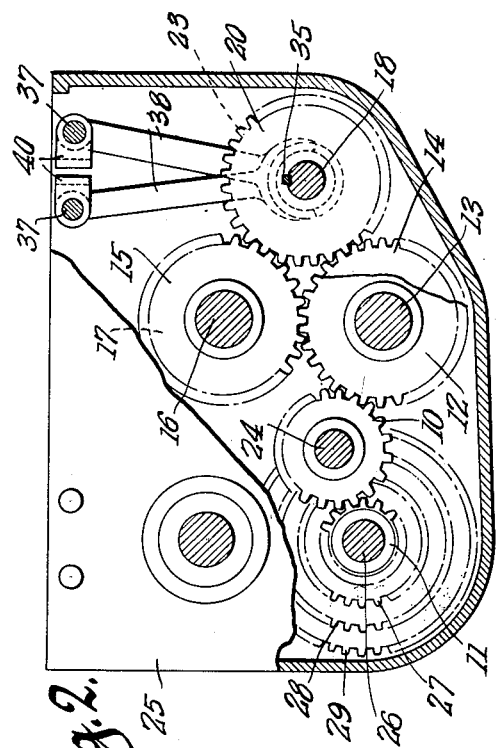
INVENTOR
John Gutmann, Jr.
BY
ATTORNEY June 12, 1934.                J. GUTMANN, JR                1,962,736
                    JACKING APPARATUS FOR MOTOR VEHICLES
                        Filed May 31, 1930        2 Sheets-Sheet 2
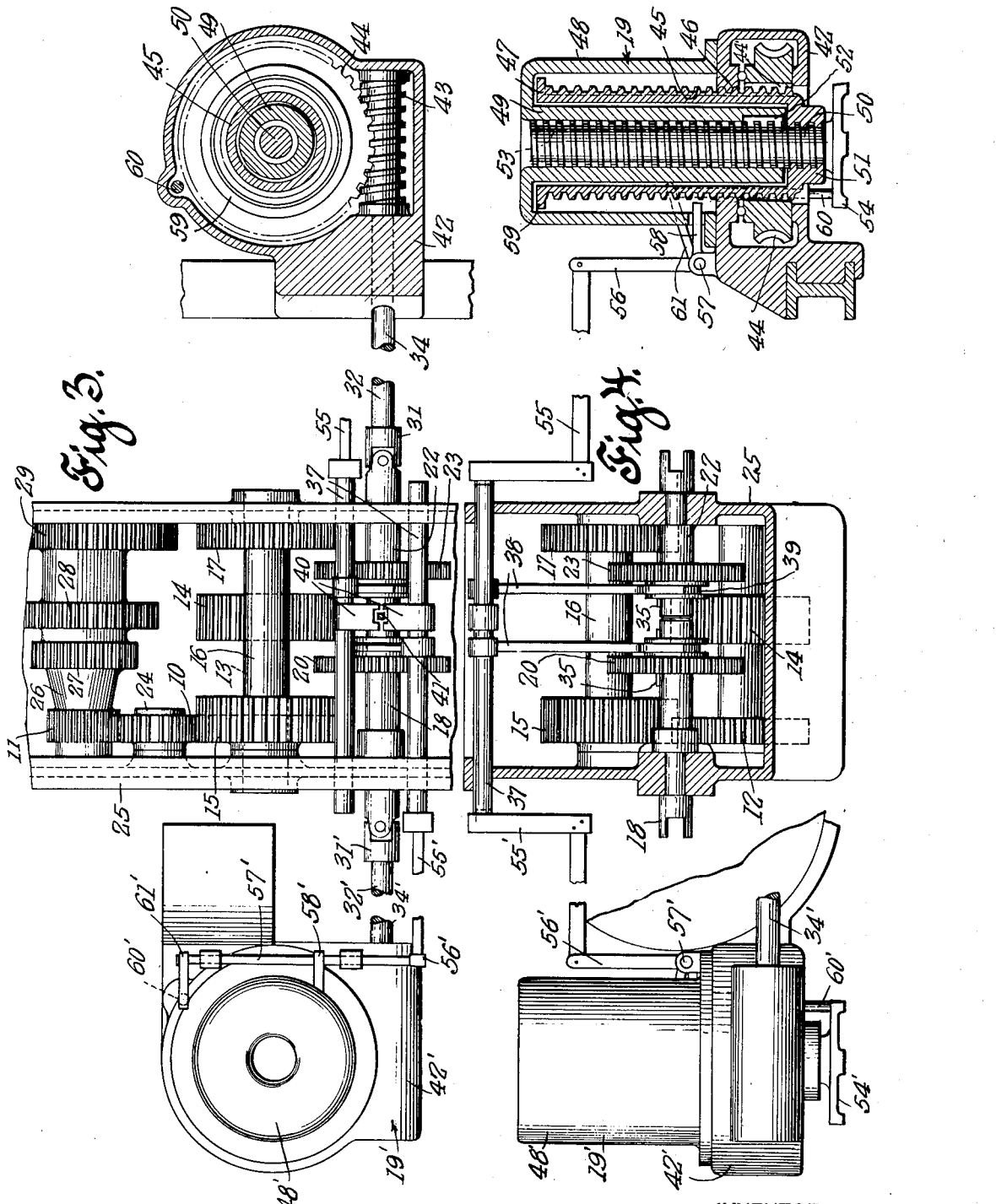
INVENTOR
John Gutmann, Jr.
BY
ATTORNEY Patented June 12, 1934

1,962,736

UNITED STATES PATENT OFFICE 1,962,736

JACKING APPARATUS FOR MOTOR VEHICLES

John Gutmann, Jr., New York, N. Y., assignor to Motor Jack Corporation, New York, N. Y., a corporation of New York Application May 31, 1930, Serial No. 458,323

3 Claims. (Cl. 74—7)

This invention relates to raising jacks for motor vehicles, and is an improvement over jacking apparatus disclosed in my application for patent filed on June 27th, 1929, Serial No. 373,963.

The invention has for an object the provision of a device of the class mentioned which is of simple, durable construction, dependable in use and efficient in action.

A further feature is the provision of raising jacks permanently carried by the vehicle, at the rear and front respectively whereby either may be raised at will.

Another aim is to utilize the motive power of the vehicle in actuating the jacks.

A further object of the invention is to provide such a device wherein the shift gears of the motor vehicle and the gears necessary to operate the jacks for forward and reverse movements are compactly arranged and enclosed, as a unit.

Another object of the invention is to provide a jack permanently carried by the vehicle wherein the jack when in inoperative position occupies comparatively little space.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Figure 1 is a side elevational view of a device constructed according to this invention, indicated as applied to the chassis of a motor vehicle.

Figure 2 is an enlarged vertical sectional view taken on the line 2—2 of Figure 1.

Figure 3 is an enlarged fragmentary plan view of the device shown in Figure 1, a portion thereof being broken away to disclose interior parts.

Figure 4 is a front elevational view of Figure 3, a portion thereof being broken away to disclose interior parts.

The jack operating mechanism comprises an idler gear 10 for meshing with a gear 11 connected for continuous rotation with the crank shaft of the motor vehicle upon which the device is applied, an intermediate gear 12 meshing with the idler gear 10 and on a shaft 13 carrying a second gear 14, an end gear 15 meshing with the intermediate gear 12, and on a shaft 16 carrying a second gear 17, a shaft 18 for driving a jack 19' upon the rear portion of the chassis (indicated by the dot and dash line 21 in Fig. 1) of the vehicle and carrying a shift gear 20 slidably and non-rotatably; another shaft 22 for driving a jack 19 upon the front portion of the chassis 21 of the vehicle and carrying a second shift gear 23 slidably and non-rotatably.

Manual means (hereinafter described) are provided for engaging the first shift gear 20 with the end gear 15 or the gear 14 on the shaft 13 of the intermediate gear 12 and engaging the second shift gear 23 with gear 14 on the shaft 13 of the intermediate gear 12 or the gear 17 on the shaft 16 of the gear 15.

Means (hereinafter described) are provided for automatically moving the shift gears simultaneously into neutral positions upon complete extension or retraction of either of the jacks.

The idler gear 10 is shown rotatively supported upon a stud shaft 24 projecting from a casing 25 enclosing all of the various gears mentioned and the shift gears of the vehicle. The gear 11 is shown upon a shaft 26 generally used in the shift of a vehicle. This shaft is shown provided with gears 27, 28 and 29 of different sizes for engaging with other gears moved by the hand levers 30 indicated in dot and dash lines in Figure 1.

This construction is generally known and therefore is not given in detail in this specification. The shaft 26 is the one which is connected with the crank shaft of the motor, but as is customary a clutch should be interposed between these parts.

The shafts 13 and 16 are rotatively mounted in the casing 25. The shafts 18 and 22 are also rotatively mounted in the casing 25 but extended therefrom. The shaft 18 includes a universal joint 31', a connecting rod 32' of the jack 19'. This same construction applies to shaft 22, that is, it includes a universal joint 33 and finally the drive shaft 34 of the front jack 19. The shift gears 20 and 23 are connected with keys 35 to the shafts 18 and 22 so as to be slidably but at the same time non-rotatably secured thereon.

The manual means for engaging the first shift gear 20 with the end gear 15 or the gear 14 on the shaft of the intermediate gear 12, and for engaging the second shift gear 23 with the gear 14 on the shaft of the intermediate gear 12 or the gear 17 on the shaft of end gear 15, consists of parallel rods 37 slidably mounted in the casing 25 and extending completely through the casing. A finger 38 projects from the parallel rods 37 to engage in grooved collars 39 attached upon the shift gears 20 and 23. Finger ends 40 project from the parallel rods 37 towards each other and their adjacent ends are formed with a pair of small lugs. A hand lever 41 is pivotally mounted on the casing 25 and extends between the adjacent ends of the fingers 40 and between the lugs on these fingers so that it may be manually moved into engagement with one or the other of the fingers by transverse movements, and after engagement upon lateral movement move the fingers for shifting the gears 20 and 23.

Each of the jacks 19—19' consists of a casing 42—42' attached upon the chassis of the vehicle and rotatively supporting the driver shafts 34—34'. Prime numbers in the drawings represent like parts described herein. A worm 43 is fixed upon the shaft 34 and meshes with a worm wheel 44 rotatively mounted in the casing 42. A sleeve 45 is threadedly engaged at 46 with a portion of the casing 42 and slidedly keyed at 44' to the worm wheel 44, thereby adapting the sleeve for rotatable and longitudinal movement. This sleeve 45 is open at the top 47 and a cap 48 is attached upon the casing 42 and is formed with a tubular portion 49 extending into the sleeve 45.

A screw 50 threadedly engages through the bottom end 51 of the sleeve 45 and passes through the tubular portion 49. This screw is held against rotation by a key 52 projecting from the tubular portion 49 and engaging in a longitudinal slot 53 extending the full length of the screw 50. A foot 54 is attached upon the bottom end of the screw 50 and is positioned below the sleeve 45.

Rotations from the shaft 34 are transmitted to the worm 43 and hence to the worm wheel 44. Since the latter element is rotatively mounted in the casing 42, upon its rotation, the hollow member 45 which threadedly engages the casing 42 at 46, cannot move simply longitudinally but must rotate at the same time. Rotations from the sleeve 45 cause the screw 50 to move longitudinally since it is restrained from any rotations by the key 52. Thus the jack is extended or retracted depending upon the rotation of the shaft 34.

The means for moving the gears 20 and 23 automatically into neutral positions upon completion of extension or retraction of said jacks, consists of an arm 55 projecting from each of the rods 37 and pivotally connected with a radial arm 56 upon a shaft 57 journalled on the casing 42. A second radial arm 58 is fixed upon the shaft 57 and projects through an opening in the cap 48 and into the path of motion of a top flange 59 upon the sleeve 45 so that when the hollow bushing is fully extended, the radial arm 58 is caused to move and transmit motion to the rod 37 so as to move this rod and move the shift gear back into neutral position. A finger 60 projects from the foot 54 and extends through a passage in the casing 42 and in the completely raised position of the foot is engageable against a third radial arm 61 projecting from the shaft 57 for pivoting the shaft and transmitting motion to the rod 37 so as to move the shift gear back into neutral position.

The operation of the device may be traced by first assuming that it is necessary to jack up the front portion of the vehicle. The operator moves the lever 41 transversely so as to engage it between the projections on the finger 40 connected with the rod 37 which connects with the front jack 19.

Next the operator moves the shift lever 41 longitudinally so that the shift gear 23 engages with the gear 17. Of course, this shift must be made while the clutch of the vehicle is out of mesh so that the teeth will not strip. The clutch is next engaged so that rotations from the motor is transmitted to the gear 11 and hence to the idler gear 10 to the end gear 15 and hence to the gear 17. This causes rotation of the gear 23, the shaft 22, the driver shaft 34, the worm 43 of the front jack, and projects the jack as before described.

When the jack is fully extended the flange 59 of the threaded sleeve 45 engages the radial arm 58 so as to transmit movements to move the shift gear 23 out of mesh with the gear 17 and back into its neutral position.

The jack may be retracted by moving the shift lever 41 so that the gear 23 engages with the gear 14 receiving rotations from the gear 12. Attention is called that necessarily the gear 14 rotates in the opposite direction to that of gear 17 and this causes the driver shaft 34 to be rotated in direction opposite to the one it just rotated in and thus retract the jack.

In the event that it is necessary to jack up the rear of the vehicle, the operator moves the lever 41 so that the shift gear 20, engages with the gear 15. Rotations are transmitted to the gear 15 from the gear 11, and the idler 10. Rotations of gear 20 are transmitted by the shaft 18 to the rear jack so that the driver shaft 34' of this jack is rotated for extending it. When fully extended the flange of the sleeve will engage against the radial arm 58' and transmit motions to move the gear 20 back to its neutral position.

And in conclusion, to retract the jack at the rear of the vehicle the lever 41 is moved so that the gear 20 is moved to engage the gear 14. The gear 14 rotates in a direction opposite to that of gear 15 and transmits rotations to retract the jack. Upon full retraction the finger 60' of the foot 54' moves the radial arm 61' so as to transmit motion to the rod 37 and move the gear 20 back to its neutral position.

While the foregoing describes the invention with some degree of particularity, it is realized that in practice various alterations therein may be made. Therefore, the right and privilege of changing the form of the details of construction or otherwise altering the arrangement of the correlated parts without departing from the spirit or the scope of the appended claims is understood.

While I have shown and described a preferred form of embodiment of this invention I am well aware that other modifications may be made and I therefore desire a broad interpretation of the invention within the scope and spirit of the disclosure herein and the claims appended hereto.

Having thus described my invention, what I claim as new, and desire to secure by United States Letters Patent is:—

1. A power take off for motor vehicles, comprising an idler gear for meshing with a gear connected for continuous rotation with the crank shaft of the motor of said vehicle, a shaft, an intermediate gear and a second gear fixed on the shaft, said intermediate gear meshing with said idler gear, a second shaft, an end gear and a second gear fixed on the shaft, said end gear meshing with said intermediate gear, a third shaft for driving a movable part, a shift gear slidably and non-rotatably carried by said third shaft, a fourth shaft for driving another movable part, a second shift gear slidably and non-rotatably carried by said fourth shaft, manually operable means for engaging the first shift gear with the said end gear or the second gear on the first mentioned shaft and engaging the second shift gear with the said second gear on the first mentioned shaft or the second gear on said second shaft.

2. A power take-off for motor vehicles, comprising an idler gear for meshing with a gear connected for continuous rotation with the crank shaft of the motor of said vehicle, a shaft, an intermediate gear and a second gear fixed on the shaft, said intermediate gear meshing with said idler gear, a second shaft, an end gear and a second gear fixed on the shaft, said end gear meshing with said intermediate gear, a third shaft for driving a movable part, a shift gear slidably and non-rotatably carried by said third shaft, a fourth shaft for driving another movable part, a second shift gear slidably and non-rotatably carried by said fourth shaft, manually operable means for engaging the first shift gear with the said end gear or the second gear on the first mentioned shaft and engaging the second shift gear with the said second gear on the first mentioned shaft or the second gear on said second shaft.

3. A power take-off for motor vehicles, comprising an idler gear for meshing with a gear connected for continuous rotation with the crank shaft of the motor of said vehicle, a shaft, an intermediate gear and a second gear fixed on the shaft, said intermediate gear meshing with said idler gear, a second shaft, an end gear and a second gear fixed on the shaft, said end gear meshing with said intermediate gear, a third shaft for driving a movable part, a shift gear slidably and non-rotatably carried by said third shaft, a fourth shaft for driving another movable part, a second shift gear slidably and non-rotatably carried by said fourth shaft, manually operable means for engaging the first shift gear with the said end gear or the second gear on the first mentioned shaft and engaging the second shift gear with the said second gear on the first mentioned shaft or the second gear on said second shaft, said manually operable means comprising a pair of parallel slidable rods provided with fingers directed towards each other, a pivotally mounted shift lever to engage with and move one or the other of the fingers and arms projecting from the rods and engaging the shift gears, and a single casing for supporting said shafts and rods and for enclosing all of said gears and the shift gears of said vehicle.

JOHN GUTMANN, JR.